(12) United States Patent
Wissell et al.

(10) Patent No.: US 7,656,906 B2
(45) Date of Patent: Feb. 2, 2010

(54) SYSTEM AND METHOD FOR COMMUNICATING A TIMING SIGNAL BETWEEN BACKPLANES

(75) Inventors: Daniel Wissell, Acton, MA (US); Cynthia Murray, Gardner, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1109 days.

(21) Appl. No.: 11/040,940

(22) Filed: Jan. 21, 2005

(65) Prior Publication Data

US 2006/0165130 A1  Jul. 27, 2006

(51) Int. Cl.
*H04J 3/06* (2006.01)
(52) U.S. Cl. .................. 370/503; 370/507; 375/356
(58) Field of Classification Search .......... None
See application file for complete search history.

(56) References Cited

U.S. PATENT DOCUMENTS

| | | | |
|---|---|---|---|
| 5,513,995 A * | 5/1996 | Kurotori et al. | 439/64 |
| 5,796,185 A * | 8/1998 | Takata et al. | 307/140 |
| 7,043,655 B2 * | 5/2006 | Wu | 713/501 |
| 7,088,579 B1 * | 8/2006 | Konshak | 361/679.32 |
| 2002/0154718 A1 * | 10/2002 | Fong et al. | 375/354 |

* cited by examiner

*Primary Examiner*—Chirag G Shah
*Assistant Examiner*—Nima Mahmoudzadeh

(57) ABSTRACT

In one embodiment, an electronic system comprises a first backplane for distributing timing signals, power, and control signals to electronic circuitry coupled to the first backplane, wherein the first backplane comprises a first clock module for generating the timing signals, a second backplane for distributing timing signals, power, and control signals to electronic circuitry coupled to the second backplane, wherein the second backplane comprises a second clock module for generating the timing signals, and an electrical connector coupling the first clock module to the second clock module for communication of a timing signal, wherein the first clock module comprises a circuit for detecting the presence of the electrical connector, the first clock module providing the timing signal to an output port coupled to the electrical connector in response to the circuit, and the second clock module synchronizes to the timing signal communicated via the electrical connector.

21 Claims, 3 Drawing Sheets

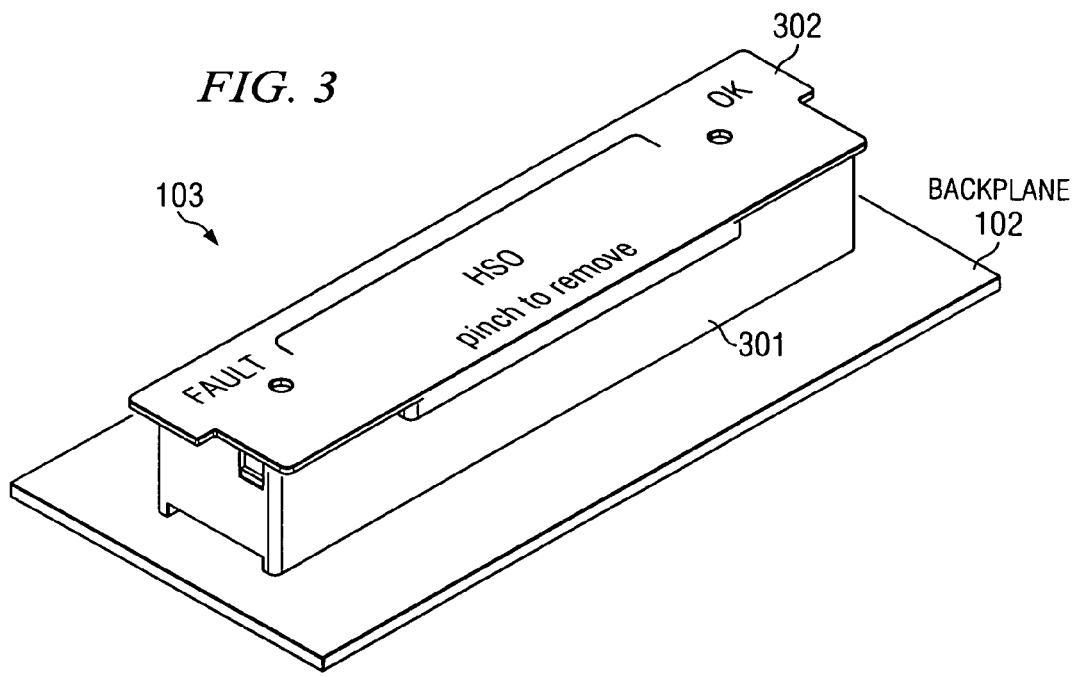
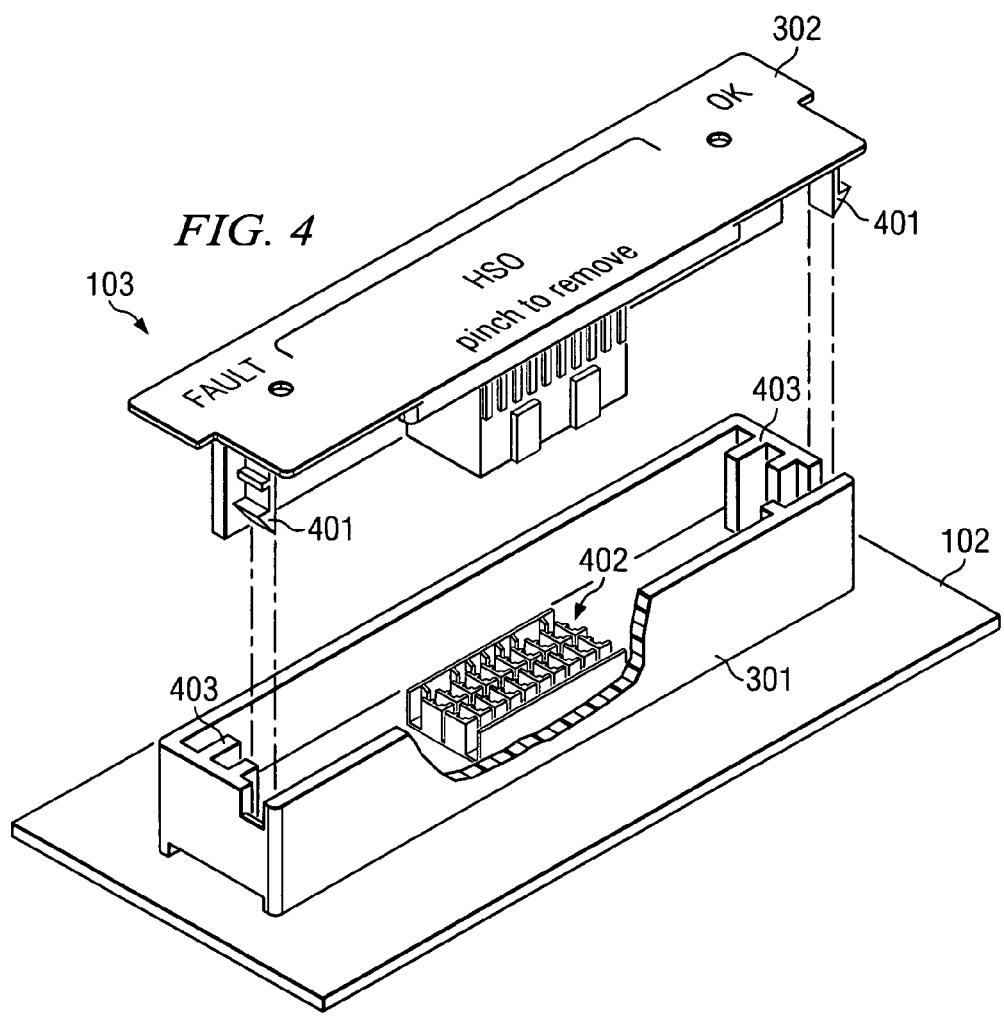

SYSTEM AND METHOD FOR COMMUNICATING A TIMING SIGNAL BETWEEN BACKPLANES

TECHNICAL FIELD

The present application is generally related to communicating a timing signal between backplanes of an electronic system.

BACKGROUND

Electronic equipment systems employ clock sources to control the timing of logic components within the systems. In traditional systems, a clock generation module or card is employed on the backplane of the system to distribute timing signals through the backplane to each chassis card. The clock generation module may include an oscillator crystal driving a phase-locked loop. The clock generation module may also possess various filtering circuits and clock duplication functionality. From the clock generation module, the clocks are distributed to the other cards of the system to control the timing of logic events.

Additionally, in more complex systems, it is often advantageous to connect multiple backplanes. To coordinate the timing between backplanes, it is typical to provide a coaxial or other cable from a timing unit on a first backplane to a timing unit on the second backplane. The coaxial cable is used to communicate a timing signal generated by the timing unit on the first backplane. The timing unit on the second backplane synchronizes to the received timing signal. Accordingly, the clocks distributed to devices of the second backplane by the second timing unit are synchronized to the clocks distributed to devices of the first backplane.

SUMMARY

In one embodiment, an electronic system comprises a first backplane for distributing timing signals, power, and control signals to electronic circuitry coupled to the first backplane, wherein the first backplane comprises a first clock module for generating the timing signals, a second backplane for distributing timing signals, power, and control signals to electronic circuitry coupled to the second backplane, wherein the second backplane comprises a second clock module for generating the timing signals, and an electrical connector coupling the first clock module to the second clock module for communication of a timing signal, wherein the first clock module comprises a circuit for detecting the presence of the electrical connector, the first clock module providing the timing signal to an output port coupled to the electrical connector in response to the circuit, and the second clock module synchronizes to the timing signal communicated via the electrical connector.

In another embodiment, a method comprises operating a first clock module on a first backplane that is adapted to distribute timing signals, power, and control signals to electronic circuitry coupled to the first backplane, operating a second clock module on a second backplane that is adapted to distribute timing signals, power, and control signals to electronic circuitry coupled to the second backplane, detecting the presence of an electrical connector coupled to an output port of the first clock module, wherein the electrical connector is coupled to an input port of the second clock module, and providing a timing signal on the output port in response to the detecting, wherein the second clock module synchronizes to the timing signal communicated through the electrical connector.

BRIEF DESCRIPTION OF THE DRAWINGS

FIG. 3 depicts a fully assembled hot-swappable oscillator device coupled to a backplane according to one representative embodiment.

FIG. 4 depicts a disassembled hot-swappable oscillator device according to one representative embodiment.

DETAILED DESCRIPTION

Some representative embodiments are directed to a clock source that is adapted to provide a timing signal from a first backplane of a computer system to a second backplane of the computer system. The clock source possesses a port to accept a coaxial cable or other suitable electrical connector. The clock source comprises a detector element for detecting the presence of the cable or connector. When the coaxial cable or connector is not detected, the clock source does not enable an external output on the output port. When the coaxial cable or connector is detected, the output from the clock source is enabled and made available on the output port. The selective enablement of the output timing signal is advantageous, because it significantly reduces the risk of electromagnetic interference/radio frequency interface (EMI/RFI) affecting system operations.

Figure 1:
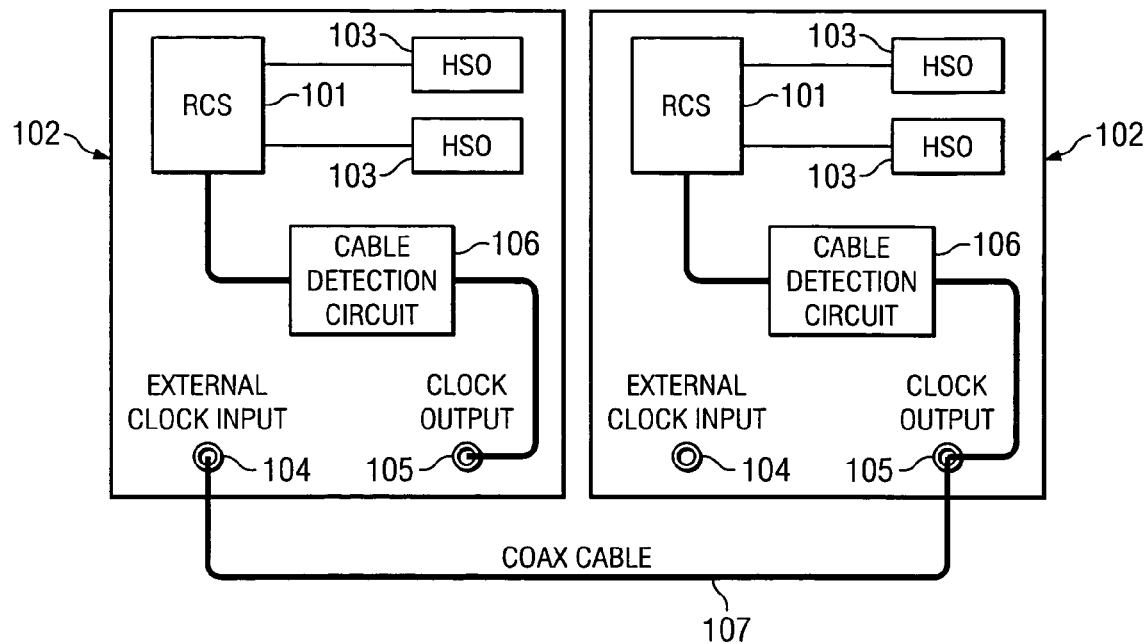
FIG. 1 depicts an electronic system according to one representative embodiment.

Referring now to the drawings, FIG. 1 depicts electronic system 100 that includes multiple backplanes 102 according to one representative embodiment. Backplanes 102 are circuit boards that contain sockets or expansion slots where other computer boards can be connected. Backplanes 102 enable power, timing signals, and control signals to be distributed to the electronic circuitry attached thereto.

Each backplane 102 of system 100 includes a respective redundant clock source 101. Redundant clock source 101 receives multiple timing signals. From one of the timing signals, redundant clock source 101 generates a clock for distribution through backplane 102 for provision to suitable circuits and devices. Redundant clock source 101 may perform electrical filtering of the clock as appropriate. Furthermore, redundant clock source 101 may perform clock duplication depending upon the number of clocks supported by a given system or platform. When providing multiple clocks, redundant clock source 101 may perform multiplication and division of the clock frequency as appropriate for particular system specifications.

Also, each backplane 102 includes a respective input port 104 for receiving a clock signal from another backplane 102 to enable synchronization of clocks. Likewise, each backplane 102 includes a respective output port 105 for this purpose. Each backplane 102 comprises a respective cable detection circuit 106 coupled to output port 105. When coaxial cable 107 is coupled to output port 105, cable detection circuit 106 detects a change in the termination impedance and communicates a signal indicating the presence of cable 107 to redundant clock source 101. In response thereto, redundant clock source 101 controls a switch (not shown), or other suitable mechanism, to communicate a clock through cable 107 via output port 105. The redundant clock source 101 of the other backplane 102 receives the clock via input port 104 and synchronizes to the received clock. Accordingly, the devices on the respective backplanes 102 operate according to the same frequency. Also, by selectively enabling the clock on output port 105, some representative embodiments provide a system that possesses greater reliability. Specifically, some representative embodiments substantially reduce the potential of EMI/RFI affecting system operations.

In addition, a plurality of hot-swappable oscillator devices 103 are used to communicate respective timing signals generated by their crystal oscillators through backplane 102 to redundant clock source 101. Furthermore, respective signals are communicated from hot-swappable oscillator devices 103 to redundant clock source 101 indicating whether hot-swappable oscillator devices 103 are fully connected to backplane 102 as will be discussed in greater detail below.

Figure 2:
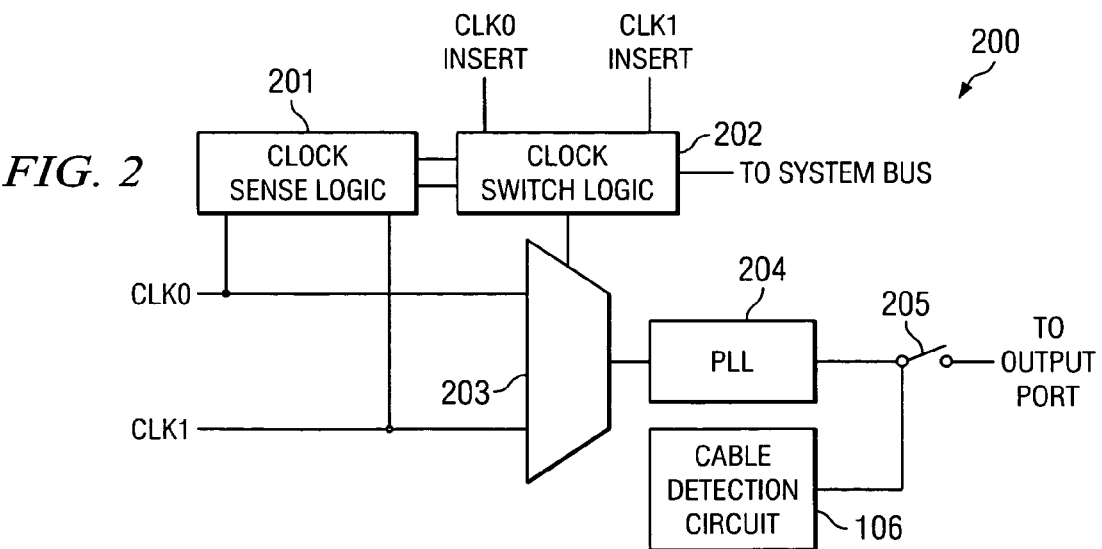
FIG. 2 depicts a circuit for inclusion within a redundant clock source according to one representative embodiment.

FIG. 2 depicts circuit 200 for inclusion within redundant clock source 101 according to one representative embodiment. Circuit 200 processes the timing signals (shown as CLK0 and CLK1) received from hot-swappable oscillator devices 103. Specifically, circuit 200 switches between the two signals as appropriate using, for example, multiplexer 203 to drive phase-locked loop 204. The clock or clocks for distribution are derived from the output of phase-locked loop 204. Cable detection circuit 106 controls switch 205 to communicate the output of PLL 204 to output port 105 (previously shown in FIG. 1) when cable 107 is connected to output port 105.

Circuit 200 selects the respective timing signal using clock sense logic 201 and switch logic 202. Clock sense logic 201 determines the signal characteristics of the timing signals. If a timing signal exhibits any undesirable characteristic, clock sense logic 201 communicates a signal to switch logic 202 to indicate that the respective timing signal should not be used to derive the clock(s). For example, clock sense logic 201 may detect "no signal" (complete failure) and stuck-at (a substantially constant amplitude) fault modes. Switch logic 202 responds by causing the other timing signal to be provided to phase-locked loop 204.

Switch logic 202 further controls the provision of timing signals to phase-locked loop 204 in response to insertion and removal of hot-swappable oscillator devices 103. When a first hot-swappable oscillator device 103 is fully engaged, a suitable signal (CLK0 INSERT or CLK1 INSERT) is communicated to switch logic 202. Switch logic 202 causes the timing signal from the inserted hot-swappable oscillator device 103 to be provided to phase-locked loop 204. After two hot-swappable oscillator devices 103 have been inserted, switch logic 202 responds to the removal of one of the hot-swappable oscillator devices 103. When one of the signals CLK0 INSERT and CLK1 INSERT is no longer provided to switch logic 202, switch logic 202 causes the timing signal associated with the other hot-swappable oscillator device 103 to be provided to phase-locked loop 204.

If a hot-swappable oscillator device 103 is detected as providing a timing signal with an undesirable characteristic or is detected as removed, switch logic 202 communicates a suitable signal through the system bus. The signal may be detected by the operating system to indicate to an administrator that appropriate action should be taken.

FIG. 3 depicts a fully assembled hot-swappable oscillator device 103 coupled to backplane 102 according to one representative embodiment. As seen in FIG. 3, hot-swappable oscillator device 103 includes base housing 301 that is mechanically coupled to backplane 102. Cover element 302 is inserted within base housing 301. Base housing 301 and cover element 302 enclose the oscillator crystal and related circuitry. Cover element 302 includes a plurality of light emitting diodes (LEDs) to indicate the functional state of hot-swappable oscillator device 103.

If the oscillator of hot-swappable oscillator device 103 ceases to function properly, cover element 302 can be removed from base housing 301 by manual depression of the side walls of cover element 302. Specifically, application of pressure displaces latches 401 thereby releasing cover element 302 as shown in FIG. 4. As seen by the removal of cover element 302, base housing 301 includes guides 403 for receiving a circuit board to which an oscillator unit is attached. Guides 403 align the oscillator unit to be coupled within header 402.

Header 402 provides a multi-level interconnect. One of the levels of the interconnect enables the presence of the oscillator unit (not shown) to be detected. A second level of the interconnect enables the timing signal generated by the oscillator unit to be communicated to redundant clock source 101 through backplane 102. The first level of the interconnect is shorter than the second level. When the oscillator unit is being removed from header 402, the first level of the interconnect is disconnected first. Accordingly, redundant clock source 101 switches timing signals in response to the disconnection of the first level of the interconnect of header 402 before the second level of the interconnect loses contact.

Figure 5:
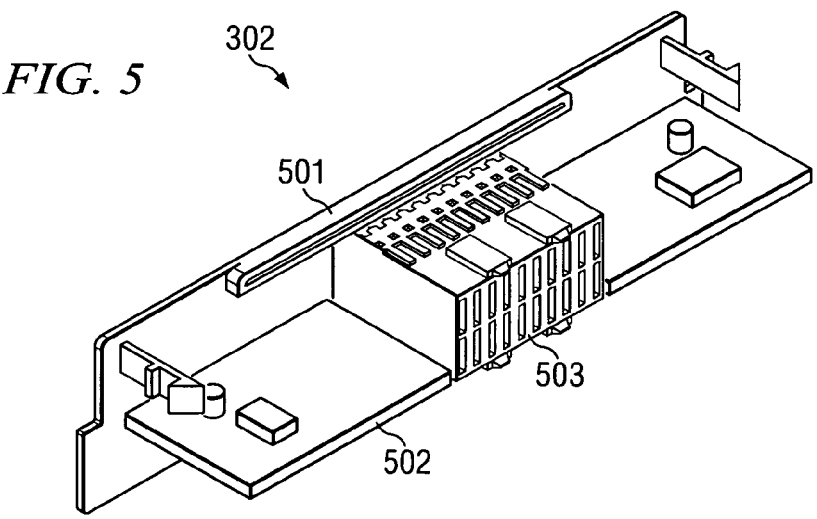
FIG. 5 depicts a cover element according to one representative embodiment.

FIG. 5 depicts a "rear" view of cover element 302 that includes mechanical portion 501, circuit board 502, and oscillator unit 503. Oscillator unit 503 is coupled to circuit board 502. Oscillator unit 503 includes the oscillator crystal and related circuitry. Oscillator unit 503 also includes an interconnect for coupling with header 402. Circuit board 502 may be coupled to mechanical portion 501 using plastic rivets or other suitable fasteners.

Figure 6:
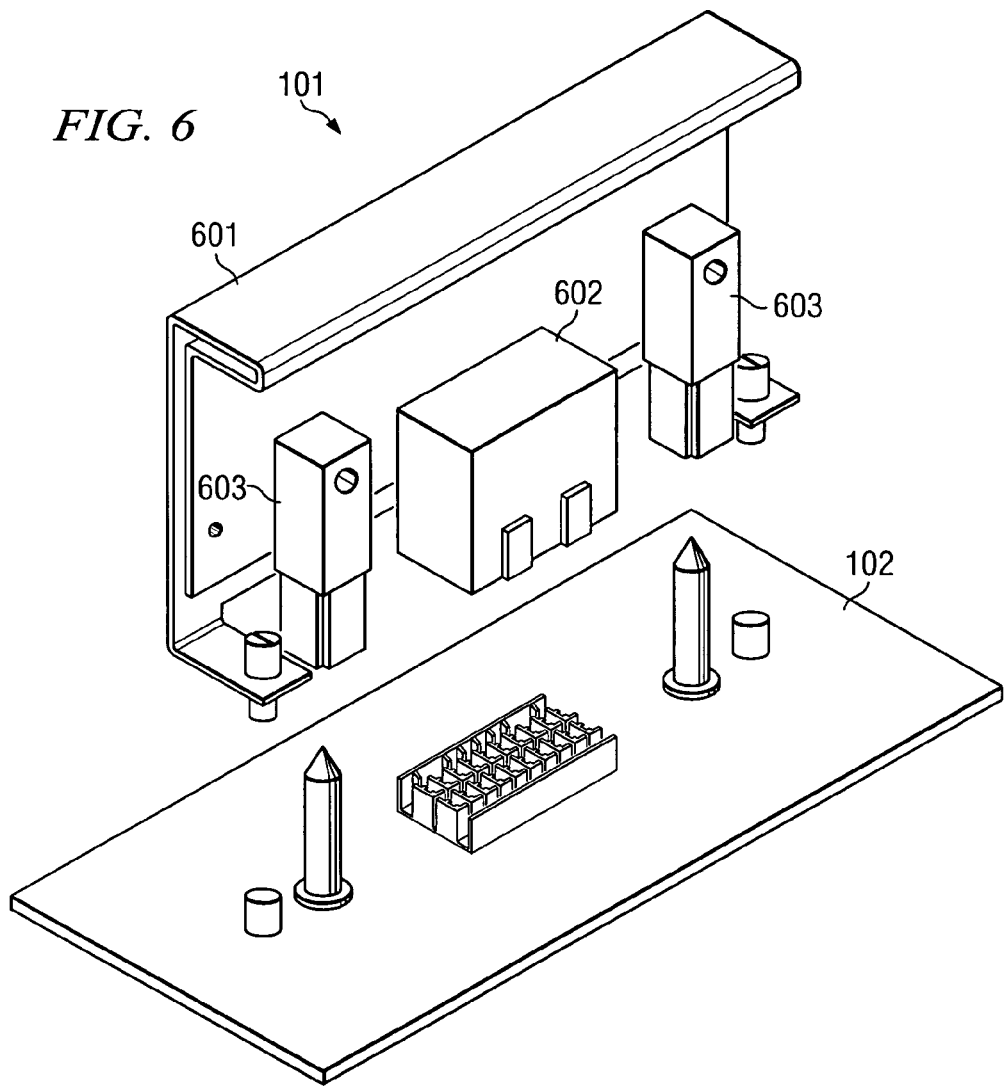
FIG. 6 depicts a redundant clock source implemented according to one representative embodiment.

In another representative embodiment, redundant clock source 101 is implemented to be connected to backplane 102 in a manner that is similar to the connection of hot-swappable oscillator devices 103. FIG. 6 depicts redundant clock source 101 implemented in this manner. Redundant clock source 101 includes circuit board 601 to which redundant clock source unit 602 is attached. Redundant clock source unit 602 encloses the clock processing circuitry for coupling with an interconnect. Redundant clock source 101 further includes alignment structures 603 to facilitate attachment of redundant clock source 101 during coupling with the interconnect.

Figure 7:
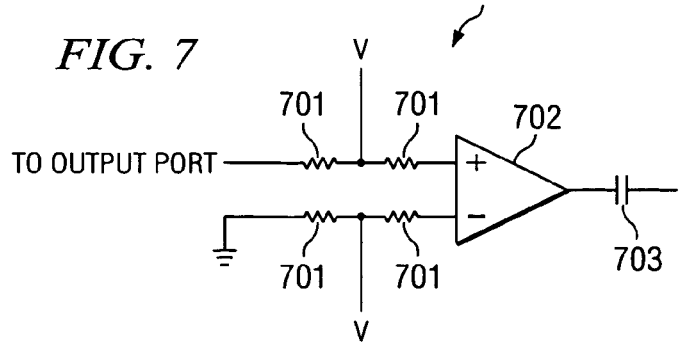
FIG. 7 depicts a circuit for detecting the presence of a cable coupled to an output port according to one representative embodiment.

FIG. 7 depicts circuit 106 for detecting the presence of a cable coupled to an output port according to one representative embodiment. Two resistors 701 are disposed between a line to output port 105 and differential op-amp 702. Similarly, two resistors 701 are disposed between a line to ground and differential op-amp 702. Respective voltage are coupled between the pairs of resistors 701. When cable 107 is attached, the positive input on op-amp 702 is less than the voltage on the negative input and, hence, op-amp 702 outputs a negative signal. When cable 107 is not attached, the opposite occurs. Capacitor 703 is used to prevent noise and transients from affecting the output of detection circuit 106.

Representative embodiments enable redundant clock distribution to electronic equipment to occur. If an oscillator unit fails, the electronic equipment continues to function without interruption. Accordingly, representative embodiments increase the availability of computer servers, telecom equipment, and/or the like. Furthermore, when an oscillator unit fails, the electronic system need not be taken offline to service the failed oscillator unit. Instead, representative embodiments enable a hot-swappable oscillator device to be removed from the system during operation of the system. Moreover, the mechanical implementation causes the replacement of a failing hot-swappable oscillator device to occur in an efficient manner. An LED on the oscillator device signals to the field technician which devices should be replaced. Also, the oscillator unit can be easily retrieved by manual depression of the device housing. Furthermore, the oscillator unit can be replaced by switching out circuit boards from the device cover.

Moreover, some representative embodiments enable multiple backplanes to be operated using the same frequency reference. Some representative embodiments enable a clock source on a first backplane to be synchronized to a clock source on a second backplane through a cable or other electrical connector. Moreover, some representative embodiments selectively enable an output timing signal from a clock source in response to the presence of the cable or electrical connector. By doing so, a significant reduction in the risk of electromagnetic interference/radio frequency interface (EMI/RFI) is achieved without requiring user-installed electrical terminators.

What is claimed is:

1. An electronic system, comprising: a first backplane for distributing timing signals, power, and control signals to electronic circuitry coupled to said first backplane, wherein said first backplane comprises a first clock module for generating said timing signals;
a second backplane for distributing timing signals, power, and control signals to electronic circuitry coupled to said second backplane, wherein said second backplane comprises a second clock module for generating said timing signals; and
an electrical connector coupling said first clock module to said second clock module for communication of a timing signal, wherein said first clock module comprises a circuit for detecting the presence of said electrical connector, said first clock module providing said timing signal to an output port coupled to said electrical connector in response to said circuit detecting the presence of said electrical connector, and said second clock module synchronizes to said timing signal communicated via said electrical connector; and
wherein said first and second clock sense modules comprise clock sense logic for detecting a substantially constant amplitude signal fault associated with one of said plurality of hot-swappable oscillator (HSO) devices.

2. The electronic system of claim 1 wherein said electrical connector is a coaxial cable.

3. The electronic system of claim 1 wherein each of said first and second clock modules comprise a plurality of hot-swappable oscillator (HSO) devices, a switch between timing signals from said plurality of HSO devices in response to oscillator removal, and a switch between timing signals in response to timing signal failure.

4. The electronic system of claim 3 wherein said plurality of HSO devices comprise a base housing and an oscillator unit for generating a timing signal, said base housing including an interconnect for coupling to said oscillator unit, said interconnect providing a first connection for said timing signal and providing a second connection to enable detection of insertion and removal of said oscillator unit.

5. The electronic system of claim 4 wherein said base housing comprise a guide structure for receiving an oscillator board to align said oscillator unit to couple with said interconnect.

6. The electronic system of claim 4 wherein plurality of HSO devices comprise a cover element that has an oscillator board coupled to said oscillator unit.

7. The electronic system of claim 6 wherein said cover element comprises a plurality of latches for mechanically coupling said cover element to said base housing that are releasable by manual depression.

8. The electronic system of claim 6 wherein said cover element comprises a light emitting element to indicate a functional state of said oscillator unit.

9. The electronic system of claim 1 wherein said first and second clock sense modules comprise clock sense logic for detecting a no signal fault associated with one of said plurality of HSO devices.

10. A method, comprising: operating a first clock module on a first backplane that is adapted to distribute timing signals, power, and control signals to electronic circuitry coupled to said first backplane;
operating a second clock module on a second backplane that is adapted to distribute timing signals, power, and control signals to electronic circuitry coupled to said second backplane;
detecting the presence of an electrical connector coupled to an output port of said first clock module, wherein said electrical connector is coupled to an input port of said second clock module;
providing a timing signal on said output port in response to said detecting, wherein said second clock module synchronizes to said timing signal communicated through said electrical connector; and
wherein said first and second clock sense modules comprise clock sense logic for detecting a substantially constant amplitude signal fault associated with one of said plurality of hot-swappable oscillator (HSO) devices.

11. The method of claim 10 wherein said electrical connector is a coaxial cable.

12. The method of claim 10 wherein each of said first and second clock modules comprise a plurality of hot-swappable oscillator (HSO) devices, switch between timing signals from said plurality of HSO devices in response to oscillator removal, and switch between timing signals in response to timing signal failure.

13. The method of claim 12 wherein said plurality of HSO devices comprise a base housing and an oscillator unit for generating a timing signal, said base housing including an interconnect for coupling to said oscillator unit, said interconnect providing a first connection for said timing signal and providing a second connection to enable detection of insertion and removal of said oscillator unit.

14. The method of claim 13 wherein said base housing comprise a guide structure for receiving said oscillator board to align said oscillator unit to couple with said interconnect.

15. The method of claim 13 wherein plurality of HSO devices comprise a cover element that has an oscillator board coupled to said oscillator unit.

16. The method of claim 15 wherein said cover element comprises a plurality of latches for mechanically coupling said cover element to said base housing that are releasable by manual depression.

17. The method of claim 15 wherein said cover element comprises a light emitting element to indicate a functional state of said oscillator unit.

18. The method of claim 10 wherein said first and second clock sense modules comprise clock sense logic for detecting a no signal fault associated with one of said plurality of HSO devices.

19. A system, comprising: first means for providing expansion slots for connection of computer boards and for distributing timing signals, power, and control signals to said computer boards, wherein said first means for providing comprises first means for generating timing signals;

second means for providing expansion slots for connection of computer boards and for distributing timing signals, power, and control signals to said computer boards, wherein said second means for providing comprises second means for generating timing signals;

means for electrically coupling said first means for generating and said second means for generating for communication of a timing signal;

wherein said first means for generating comprises means for detecting said means for electrically coupling and, in response to a signal from said means for detecting, provides a timing signal to an output port coupled to said means for electrically coupling;

wherein said second means for generating synchronizes to said timing signal communicated via said means for electrically coupling;

wherein said means for detecting is configured to detect a substantially constant amplitude signal fault associated with one of said plurality of hot-swappable oscillator (HSO) devices.

20. The system of claim 19 wherein each of means for generating switch between timing signals from oscillator devices in response to oscillator failure.

21. The system of claim 19 wherein each of means for generating switch between timing signals from oscillator devices in response to oscillator device removal.

* * * * *

UNITED STATES PATENT AND TRADEMARK OFFICE
CERTIFICATE OF CORRECTION

PATENT NO. : 7,656,906 B2 Page 1 of 1
APPLICATION NO. : 11/040940
DATED : February 2, 2010
INVENTOR(S) : Daniel Wissell et al.

It is certified that error appears in the above-identified patent and that said Letters Patent is hereby corrected as shown below:

In column 8, line 5, in Claim 19, after "coupling;" insert -- and --.

Signed and Sealed this

Eleventh Day of May, 2010

David J. Kappos
*Director of the United States Patent and Trademark Office*